(12) United States Patent
Gumirov et al.

(10) Patent No.: US 9,226,154 B2
(45) Date of Patent: Dec. 29, 2015

(54) METHOD FOR PRESENTING INFORMATION WHEN CONDUCTING DISTRIBUTED TRANSACTIONS AND STRUCTURE FOR IMPLEMENTING SAME

(75) Inventors: Vitaliy Shamilovich Gumirov, Novosibirsk (RU); Petr Yurievich Matyukov, Berdsk (RU)

(73) Assignee: EYELINE COMMUNICATIONS CIS, LLC. (RU)

( * ) Notice: Subject to any disclaimer, the term of this patent is extended or adjusted under 35 U.S.C. 154(b) by 0 days.

(21) Appl. No.: 14/004,028

(22) PCT Filed: Jun. 23, 2011

(86) PCT No.: PCT/RU2011/000434
§ 371 (c)(1),
(2), (4) Date: Oct. 15, 2013

(87) PCT Pub. No.: WO2012/134330
PCT Pub. Date: Oct. 4, 2012

(65) Prior Publication Data
US 2014/0141748 A1 May 22, 2014

(30) Foreign Application Priority Data

Mar. 25, 2011 (RU) .................................. 2011111370
Mar. 25, 2011 (RU) .................................. 2011111477

(51) Int. Cl.
*H04M 3/16* (2006.01)
*H04W 12/06* (2009.01)
(Continued)

(52) U.S. Cl.
CPC ............... *H04W 12/06* (2013.01); *G06Q 20/32* (2013.01); *G06Q 20/3255* (2013.01);
(Continued)

(58) Field of Classification Search
CPC .... G06Q 20/32; G06Q 20/3255; H04L 51/38; H04L 63/08; H04L 63/0853; H04L 67/141; H04W 12/06; H04W 4/02; H04W 4/14

USPC ........ 455/410, 411, 412.1–412.2, 420–422.1, 455/550.1, 556.2
See application file for complete search history.

(56) References Cited

U.S. PATENT DOCUMENTS 7,647,055 B2     1/2010   Gum et al.
2006/0131390 A1  6/2006   Kim

FOREIGN PATENT DOCUMENTS

EP     1986164 A2   10/2008
GB     2402792 A    12/2004
(Continued)

*Primary Examiner* — Babar Sarwar
(74) *Attorney, Agent, or Firm* — Pequignot + Myers; Matthew A. Pequignot

(57) ABSTRACT

The invention relates to methods and systems for conducting distributed transactions. The method comprises collecting and transmitting information, setting up a USSD session with a user of a mobile device, and using safe communication channels. The collection of information is performed from information-containing components or GSM/UMTS mobile cellular communication networks or LBS systems of GSM/UMTS mobile cellular communications operators or a GPS system or Wi-Fi positioning systems or combinations thereof. The transmission of information is performed by sending an SMS message to a user's mobile device in the transaction mode via Signaling System No. 7 (SS7) network components. The structure comprises an interface unit, which is connected to the transaction system, an information unit, which is connected to the interface unit and is designed to collect information, an SMS unit, which is connected to the interface unit and to the SS7 network components, and a USSD unit, which has a connection to the interface unit and to the SS7 network components. The setting-up of the USSD session is performed via SS7 network components with a user of a mobile device, which is registered in either a home or a visited GSM/UMTS mobile cellular communication network.

11 Claims, 1 Drawing Sheet

(51) Int. Cl.
   *H04W 4/02* (2009.01)
   *H04W 4/14* (2009.01)
   *H04L 29/08* (2006.01)
   *H04L 29/06* (2006.01)
   *G06Q 20/32* (2012.01)
   *H04L 12/58* (2006.01)

(52) U.S. Cl.
   CPC ......... *H04L 63/0853* (2013.01); *H04L 67/141* (2013.01); *H04W 4/02* (2013.01); *H04W 4/14* (2013.01); *H04L 51/38* (2013.01); *H04L 63/08* (2013.01)

(56) References Cited

FOREIGN PATENT DOCUMENTS

| | | |
|---|---|---|
| RU | 2336654 C1 | 10/2008 |
| WO | 00/62262 A1 | 10/2000 |
| WO | 2007/100401 A2 | 9/2007 |
| WO | 2009/090428 A1 | 7/2009 |
| WO | WO 2009090428 A1 * | 7/2009 |

* cited by examiner

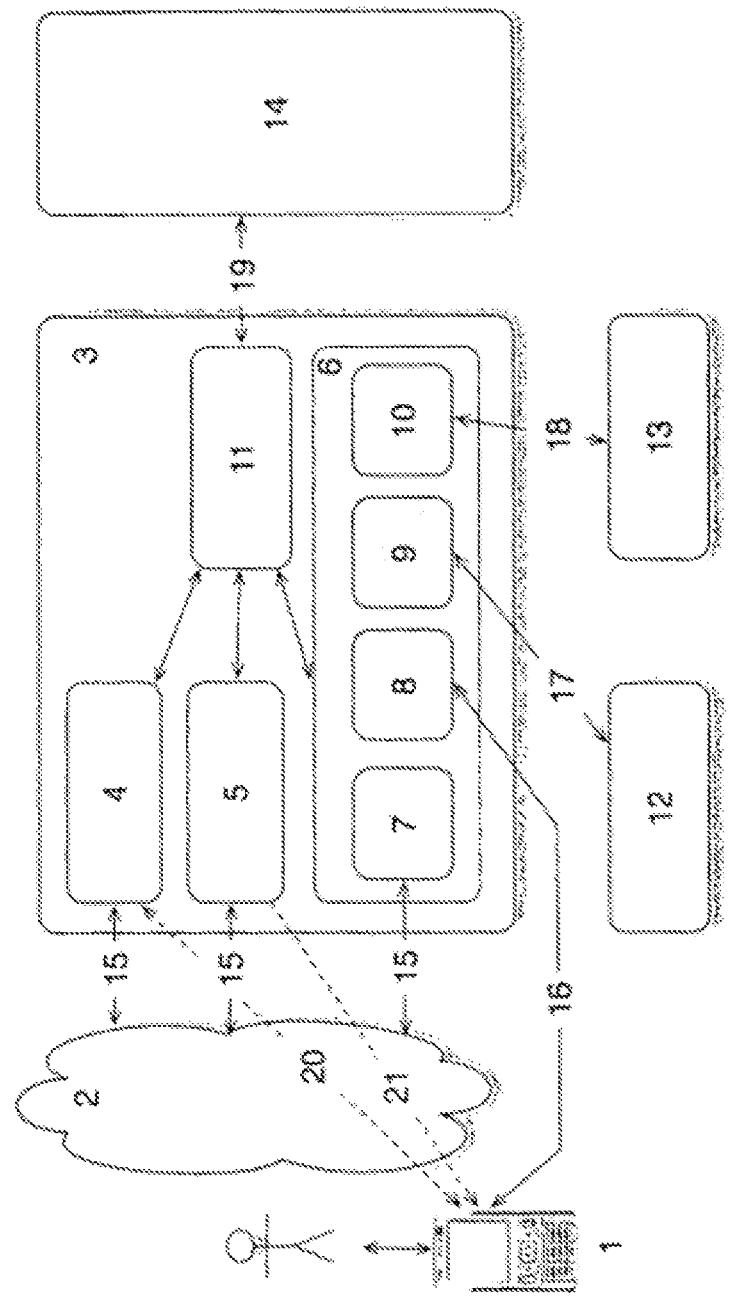

METHOD FOR PRESENTING INFORMATION WHEN CONDUCTING DISTRIBUTED TRANSACTIONS AND STRUCTURE FOR IMPLEMENTING SAME

CROSS-REFERENCE TO RELATED APPLICATION

This national stage 371 application claims the priority of International Application No. PCT/RU2011/000434, filed Jun. 23, 2011, designating the United States, incorporated herein in its entirety by reference, which claims the priority of Russian Federation Application No. 2011111477, filed Mar. 25, 2011 and Russian Federation Application No. 2011111370, filed Mar. 25, 2011.

The invention relates to methods and systems for conducting distributed transactions, in particular, to methods and systems allowing extra information to be provided for selecting an optimal scenario of communication with a user and maintaining such communication in real time.

Transaction in informatics is a group of consecutive operations that is a logic data processing unit. A transaction may be executed as a whole and successfully by maintaining the integrity of data and independently of other ongoing parallel transactions, or may not be executed at all, in which case it must not produce any effect. Transactions are processed by transaction systems that generate transaction histories in operation. There are consecutive (ordinary), parallel, and distributed transactions. The term "distributed transactions" suggests the use of more than one transaction system and the need for more complex logic (for example, a two-phase transaction recording protocol). A modern human being increasingly becomes, wittingly or unwittingly, involved in distributed transactions, and it is important to optimize communication with the user and organize communication in a fast and convenient way so that a transaction requires the least inputs of time, human, and technical resources, can be performed in any place at any time, and does not need specialized devices, such as computers connected to the Internet or a payment terminal. Many institutions, such as banks, already use mobile communication devices for communicating with their customers. This is a convenient option because a mobile device is carried by its owner virtually around the clock, which means that this is the fasted way to give the user notice of anything and/or receive a reply from the user. Processing as many transactions as possible within the shortest time with an assurance of faultless results is an important requirement on transaction systems performing distributed transactions.

If, however, a user whose response takes extra time to be received is involved in the process, the mobile devices used to perform distributed transactions take more time to complete a transaction, even though they are convenient and simple. Moreover, far from all communication methods can assure the desired speed. This problem can be resolved by using scenarios in which communication with the user of a mobile device is maintained in real time or without involving the user at all, for example, by using information about the user's mobile device, such as location and accessibility. The use of these methods complies with the requirements of the transaction system—receiving a result within an assured period of time. Furthermore, omitting the step of communication with the user from a distributed transaction helps reduce its costs.

Methods for information exchange with prior notification and authorization of banking transactions and systems for performing the same are known in the art (European Patent EP 1986164, IPC G06Q20/00; G07F7/08; H04L29/06, priority of Oct. 29, 2008; U.S. Patent Application 2006131390, IPC G06K5/00; G06Q40/00; G06K5/00; G06Q40/00, priority of Jun. 22, 2006). Information about a transaction performed is received by a system comprising means to register users, maintain their payment accounts, and authorize transactions. For authorization purposes, the system requests information from the user through the user's mobile device assigned to a respective account by using the SMS channel.

A disadvantage of the prior art method is that a transaction can only be executed with involvement of the user who has to send approval in the form of an SMS message. Furthermore, receiving and providing information may take considerable time and the process result is barely predictable because the system sending the request cannot verify delivery of the request and does not receive information about the delivery results, and only stands by waiting for a response from the mobile device. An SMS message containing the request may be delayed because of heavy traffic in the cellular operator's network, the user being in a roaming status, or may not be delivered at all, if, for example, the incoming message box of the user's mobile device is full. Information contained in the response message may be delayed for the same reasons or not be sent by the user at all in the absence of sufficient funds in the user's account. If the user sends another request before receiving an SMS message, the SMS message sent in response to the second request may be delivered ahead of the first SMS message and will not be received by the system. Besides, this method requires expenses to be incurred by the user, particular during a roaming session, or by the banking system requesting authorization, and also adds to the traffic in the mobile cellular communication network to strain signaling resources to deliver and receive SMS messages.

Prior art methods for providing information required for performing transactions without involving the user and systems for carrying out said methods (Application WO No. 0062262, IPC G06Q20/00; G07F7/10; H04L29/06; G06Q20/00; G07F7/10; H04L29/06; (IPC 1-7): G07F7/08;G07F7/10, priority of Oct. 19, 2000; and Patent GB No. 2402792, IPC G06F21/00; G06Q20/00; G07C9/00; G06F21/00; G06Q20/00; G07C9/00; (IPC 1-7): G07F7/10, priority of Dec. 15, 2004) use information about the location of the mobile device. The prior art systems for performing prior art methods comprise means to register users and maintain a database of compatibility of the payment account and the mobile device, and also means to obtain information about the location of the terminal initiating a transaction, and a respective mobile device. On the basis of the information received, the system decides to complete or reject a transaction.

The prior art methods and systems are disadvantageous because of all the information available about a mobile device they only use information about its location by using data provided by the LBS (Location-Based Service) system of mobile cellular communication providers, or GPS (Global Positioning System) data, at a significant effort and cost of establishing communication with said systems and maintaining respective location databases in the actual state, with a significant increase in the traffic in the infrastructure of mobile cellular communication operators and the signaling network. The prior art methods have a small area of applications, being only used for authorizing banking transactions. Moreover, the prior art inventions cannot provide information for executing a transaction when the user must be involved directly to provide such information.

Known in prior art is a method for providing information for performing distributed transactions and a structure for carrying out the same that comprises an interface unit (Application WO No. 2009090428, IPC G06F21/00; H04L29/06;

G06F21/00; H04L29/06, priority of Jul. 23, 2009). The prior art method and structure for carrying out the same are the closest related prior art of the present invention. When a transaction is performed in the prior art method through an unsecured network, information approving the transaction is received through another, secured mobile communication network, for which purpose a dialogue is opened with the user through the user's mobile device assigned to an account in the form of a USSD session, wherein USSD is a standardized, 3GPP TS 22.090, ETSI TS 123 090, ETSI TS 124 090, method for requesting extra services in GSM/UMTS mobile cellular communication networks, allowing a USSD session to be established, using a structure comprising an interface unit authenticating and converting an approval request from a first network to a second network such that the request can be transmitted through the second network to the mobile device for approval purposes. Information is received in real time from the user through the user's mobile device during the USSD session opened with the user.

The prior art invention is disadvantageous because information needed for performing transactions can only be received from the user in person, drawing on the mobile cellular communication operator's resources to open a USSD session and apply a rigid algorithm limiting the communication scenarios. Communication also requires signaling resources to be used and, therefore, costs to be borne to maintain it.

It is an object of the present invention to develop a method for providing information needed to perform distributed transactions and a structure for carrying out the method permitting a transaction to be continued or performed with or without the user's involvement on the basis of information about the mobile device, signaling resources used sparingly, and communication scenarios and the system as a whole to be optimized.

The object of the invention is attained in a method for providing information needed to conduct distributed transactions, said method comprising collecting and transmitting information; opening a USSD session with the user of a mobile device; and using secure communication channels and a structure provided with an interface unit connected to a transaction system, further information being collected from information-containing components thereof, or GSM/UMTS mobile cellular communication networks, or LBS systems of GSM/UMTS mobile cellular communication operators, or the GPS, or positioning systems over Wi-Fi networks, or combinations thereof, information being transmitted by sending an SMS message to the user's mobile device in the transaction mode through SS7 network components; the structure being provided with an information unit connected to the interface unit and capable of collecting information; an SMS unit connected to the interface unit and to the SS7 network components; a USSD unit connected to the interface unit and to the SS7 network components; and the USSD session being opened through the SS7 components with the user of the mobile device registered on either the home or visiting GSM/UMTS mobile cellular communication network, wherein USSD is a standardized, 3GPP TS 22.090, ETSI TS 123 090, ETSI TS 124 090, method for requesting extra services in GSM/UMTS mobile cellular communication networks permitting a USSD session to be opened; GSM is the Global System for Mobile Communications; UMTS is the Universal Mobile Telecommunications System developed by ETSI for introducing 3G (third generation) GSM networks; LBS is the Location-Based Service; GPS is the Global Positioning System; Wi-Fi is a system of IEEE 802.11 wireless local networks; SMS is the Short Message Service, a technology permitting short text messages to be sent and received on a cellular phone; an SS7 is a common Signaling System No. 7, a standardized ITU (International Communication Union) system connecting elements of digital telecommunications networks. Information includes, but is not limited to, data on accessibility of a mobile device, its location, its roaming status, and other data required for executing distributed transactions. Information is collected from information-containing components of a GSM/UMTS mobile cellular communication network through SS7 network components. Information is transmitted to the user by sending an SMS message in the transaction mode to the user's mobile device over the SS7 network components irrespective of the user's registration on the home or visiting GSM/UMTS mobile cellular communication network. In addition, the information unit comprises a module communicating with components of the GSM/UMTS mobile cellular communication network through SS7 network components; a module communicating with GPS components; a module communicating with components of LBS systems of the GSM/UMTS mobile cellular communication operators using protocols developed for these systems; and a module communicating with components of the positioning systems over Wi-Fi networks using protocols developed for these systems.

A structure for performing the method as claimed in claim 1, comprising an interface unit connected to a transaction system, further comprises an information unit connected to the interface unit and collecting information from information-containing components of GSM/UMTS mobile cellular communication networks through SS7 network components, or the LBS systems of the GSM/UMTS mobile cellular communication operators, or the GPS, or positioning systems over Wi-Fi networks; a USSD unit connected to the interface unit and the SS7 network and capable of opening and maintaining a USSD session with the user of a mobile device registered on the home or visiting GSM/UMTS mobile cellular communication network; and an SMS unit connected to the interface unit and the SS7 network and permitting SMS messages to be sent in the transaction mode to the mobile device registered on the home or visiting GSM/UMTS mobile cellular communication network. The information unit comprises a module communicating with components of the GSM/UMTS mobile cellular communication networks through SS7 network components to collect information; a module communicating with GPS components to collect information; a module communicating with components of the LBS systems of the GSM/UMTS mobile cellular communication operators using protocols developed for these systems to collect information; and a module communicating with components of positioning systems over Wi-Fi networks using protocols developed for these systems to collect information.

The technical effect achieved in the claimed invention is that the invention permits information to be provided for performing transactions with or without the user involved directly, and does not require connection to a designated mobile cellular communication operator, so that the traffic in the operator's infrastructure and the signaling network is reduced. Further, it permits sparing use of the traffic and helps reduce the costs of, and simplify, connection of an external transaction system as a whole.

The invention is illustrated with the following drawing:

FIG. 1 shows a block diagram explaining the operation of the claimed invention, wherein 1 is a user's mobile device; 2 is an SS7 network comprising various components thereof; 3 is a structure; 4 is a USSD unit; 5 is an SMS unit; 6 is an information unit; 7 is a module communicating with the SS7 network; 8 is a module communicating with the GPS; 9 is a module communicating with the LBS; 10 is a module communicating with the Wi-Fi network; 11 is an interface unit; 12 are components of the LBS systems of mobile cellular communication operators; 13 are components of the positioning systems over Wi-Fi networks; 14 is an external transaction system; 15 is communication with the SS7 network components using the MAP protocol, wherein MAP is a Mobile Application Part, standardized, 3GPP TS 29.002, protocol of communication between components of mobile cellular communication networks with one another and with other components of the SS7 network; 16 is communication with GPS components through the GPS positioning application in the mobile device; 17 is communication with components of the LBS systems of mobile cellular communication operators using protocols developed for these systems; 18 is communication with components of the positioning systems over Wi-Fi networks using protocols developed for these systems; 19 is communication with the external transaction system using protocols providing for remote communication; 20 is communication between the USSD unit and the user's mobile device when a USSD session is opened and maintained with a standard set of signaling protocols of GSM/UMTS mobile cellular communication networks; and 21 is an SMS message transmitted to the user with a standard set of signaling protocols of GSM/UMTS mobile cellular communication networks.

For the purposes of describing the present invention, an external transaction system is any system communicating with the user and controlling distributed transactions in real time. The list of such systems includes, but is not limited to, bank account maintenance, payment of fines, taxes, and other charges, Internet e-shopping, access to databases, sites, electronic content, and so on, control over car and premises alarms, and other systems. For the use of the claimed invention, this external transaction system must support at least a database containing information about the user's one or more mobile device numbers and be connectable to the claimed system with protocols permitting remote communication, including TCP/IP (Transmission Control Protocol/Internet Protocol), a set of protocols to transmit data over data transmission networks developed by the Internet Engineering Task Force (IETF) and described by RFC 793 (for TCP) and RFC 791 (for IP) standards, the HyperText Transfer Protocol (HTTP), an application-level data transfer protocol described by the IETF standards RFC 2616, SMPP (Short Message Peer to Peer Protocol, specified), SMPP Developers Forum protocol for communication between external applications and infrastructure components of mobile cellular communication operators, SOAP (Simple Object Access Protocol), a protocol for exchanging structured messages in a distributed computer medium developed by the World Wide Web Consortium (W3C) and described by the SOAP Version 1.2 specification, or later versions. The logic of communication with the user is determined by the external transaction system holder.

The claimed method is performed by a structure 3 that comprises an interface unit 11 and also a USSD unit 4, an SMS unit 5, and an information unit 6 that are all connected to interface unit 11 and signaling system SS7, information unit 6 comprising a module 7 for communication with SS7, a module 8 for communication with the GPS, a module 9 for communication with LBS, and a module 10 for communication with the Wi-Fi network that can connect it to the components of respective networks and systems with protocols used by them.

USSD unit 4 is connected to interface unit 11 and is capable of communicating with the components of GSM/UMTS mobile cellular communication networks through SS7 network components using the MAP protocol. USSD unit 4 is used to obtain information from the user's mobile device 1 as a USSD session is established from the network initiated. That is, a USSD dialogue may be opened at the initiative of external transaction system 14 directly to the user's mobile device 1. External transaction system 14 may request further information about mobile device 1, for example, its roaming status, and receive this further information simultaneously with information transmitted from the user's mobile device 1. The USSD session opened as a result is maintained by USSD unit 4 without requiring direct connection to the mobile cellular communication network to which the user's mobile device 1 is registered, that is, the user's mobile device 1 may be registered on both the home and visiting GSM/UMTS mobile cellular communication network.

SMS unit 5 is connectable to interface unit 11 and is capable of communicating with components of GSM/UMTS mobile cellular communication networks through components of SS7 network 2 using the MAP protocol. SMS unit 5 is used to send SMS messages in the transaction mode to the user's mobile device 1 and also receive information about message delivery within a specified time period. The transaction mode is a mode in which SMS messages are sent and a one-time instant attempt is made to deliver a message to the end recipient, the result—successful or unsuccessful—of this attempt being confirmed to the source sender within a definite time period known in advance.

Information unit 6 is connected to interface unit 11 and comprises modules communicating with components of information-containing networks and systems. Module 7 communicating with SS7 is connected to SS7 signaling network 2 and is capable of communicating using the MAP protocol with components of GSM/UMTS mobile cellular communication operators, in particular, HLR and VLR, to receive extra information about the user's mobile device 1, wherein HLR is the Home Location Registry where information about all subscribers having subscription from a definite operator is stored, and VLR is the Visiting Location Registry storing information about all subscribers (own and other operators' subscribers) registered in a designated operator's definite service zone at a certain point in time. Module 8 for communication with the GPS is capable of communicating with the GPS components through a GPS positioning application installed in the mobile device and permits information to be received from, and sent to, GPS components. Module 9 for communication with LBS is connected to components of the LBS systems of GSM/UMTS mobile cellular communication operators and is capable of communicating with them using protocols developed for said systems. Module 10 for communicating with the Wi-Fi networks is connected to the positioning system components over Wi-Fi networks and is capable of communicating therewith using protocols developed for said systems. Information unit 6 is intended for receiving information from components of information-containing networks and systems through respective modules and providing, through interface unit 11, external information system 14 with information about the user's mobile device 1, such as accessibility, location, roaming status or blocking. This information may be received from one information-containing network or system, or simultaneously from several of them independently from one another.

Interface unit 11 is connected to USSD unit 4, SMS unit 5, and information unit 6, and also to external transaction system 14 using protocols, including TCP/IP, HTTP, SMPP, and SOAP protocols, permitting remote communication. Interface unit 11 is designed to recognize and convert a request from external transaction system 14 so that extra information about mobile device 1 received by information unit 6 can be transmitted in response to the request, or said request may be transmitted to mobile device 1 by USSD unit 4 or SMS unit 5, and also recognize and convert the response information from mobile device 1 to be sent back to external information system 14.

The claimed method is initiated by connecting external information system 14 to structure 3 for delivering information thereto. External transaction system 14 comprises at least a database of the user's compatibility with at least one number of the user's mobile device. Further, external transaction system 14 creates, in accordance with its requirements, an algorithm of communication with the user on the user's mobile device 1 to perform a distributed transaction. The algorithm may provide for the transaction to be performed with the user's involvement, for example, in the form of a USSD dialogue, or without involving the user, for example, on the basis of the information about the user's mobile device 1 received from the claimed structure.

To execute a distributed transaction, external transaction system 14 controlling the transaction according to its algorithm sends a request to structure 3. The request arrives in interface unit 11 that recognizes it and, depending on the content of the request, queries information unit 6 for information about a relevant user's mobile device 1 or converts the request so as to transmit it to the user's mobile device 1 over mobile cellular communication networks through USSD unit 4 or SMS unit 5.

If the request from external transaction system 14 contains a demand for information about the user's mobile device 1, interface unit 11 sends this request to information unit 6 that receives the required information through one or several modules communicating with the components of information-containing networks and systems and transmits it to interface unit 11 that, in turn, converts the information to a format recognized by external transaction system 14 and transmits the information in response to the request.

If the request from external transaction system 14 contains a demand for information that cannot be delivered without involving the user, for example, the preinstalled password authorizing the transaction, interface unit 11 sends the request to USSD unit 4. USSD unit 4 opens a USSD session retrieved from the network with the user's mobile device 1 and sends the demand of transaction system 14 using a standard set of signaling protocols of the GSM/UMTS mobile cellular communication networks. The user's mobile device 1 may be registered on both the home and visiting GSM/UMTS mobile cellular communication networks. As the USSD session goes on, maintained by USSD unit 4, interface unit 11 receives information from external transaction system 14 and returns it to the user's mobile device 1, and back again to recognize and convert it accordingly.

If the request from external transaction system 14 contains a demand for information to be transmitted to the user's mobile device 1 without opening a USSD session, interface unit 11 sends this request to SMS unit 5. SMS unit 5 transmits information as an SMS message to mobile device 1 through the components of SS7 network 2 using a standard set of signaling protocols of GSM/UMTS mobile cellular communication networks. The user's mobile device 1 may be registered on both the home and visiting GSM/UMTS mobile cellular communication network. SMS unit 5 is configured for the SMS message to be transmitted in the transaction mode. In this case, SMS unit 5 may provide, for a specified time period, delivery information or the reason for which the message cannot be delivered to mobile device 1. This information is delivered, through interface unit 11, to external transaction system 14.

The invention claimed is:

1. A method for providing information when conducting distributed transactions between a user's mobile device connected to a Signaling System No. 7 (SS7) network, and an interface unit connected to a transaction system and to the SS7 network, the method comprising:
   recognizing at the interface unit a request received from the transaction system as one that must be delivered to the mobile device or not,
   when the request contains a demand for information that cannot be delivered without involving the user or a demand for information to be transmitted to the mobile device, sending the received request through the SS7 network using a Unstructured Supplementary Service Data (USSD) session with the mobile device or a Short Message Service (SMS) message to the mobile device, and
   when the request contains a demand for information about the mobile device, collecting further information by the interface unit without involving the user from information-containing components of one or more of the following sources connected to the interface unit: Global System for Mobile Communication/Universal Mobile Telecommunication System (GSM/UMTS) mobile cellular communication networks, Location Based Services (LBS) systems of GSM/UMTS mobile cellular communication operators, GPS, and positioning systems over Wi-Fi networks, thereby reducing traffic in the SS7 network;
   wherein the information includes data about the accessibility of the mobile device, roaming status of the mobile device, and other data required for conducting distributed transactions; and
   wherein the information is collected from the information-containing components of GSM/UMTS mobile cellular communication networks through components of the SS7 network.

2. A method as claimed in claim 1, wherein information is transmitted to the user's mobile device by sending an SMS message in the transaction mode through components of the SS7 networks regardless of its registration on the home or visiting GSM/UMTS mobile cellular communication network.

3. A method as claimed in claim 1, wherein the information unit comprises a module communicating with components of the GSM/UMTS mobile cellular communication networks through components of the SS7 network.

4. A method as claimed in claim 1, wherein the information unit comprises a module communicating with components of the GPS.

5. A method as claimed in claim 1, wherein the information unit comprises a module communicating with components of LBS systems of GSM/UMTS mobile cellular communication operators using protocols developed for these systems.

6. A method as claimed in claim 1, wherein the information unit comprises a module communicating with components of the positioning systems over Wi-Fi networks using protocols developed for these systems.

7. A device for providing information to a transaction system when conducting distributed transactions between a user's mobile device connected to an SS7 network, and the transaction system comprising:
   an interface unit connected to the transaction system
      an information unit connected to the interface unit capable of collecting information from information-containing components of one or more sources selected from the group consisting of: GSM/UMTS mobile cellular communication networks through components of the SS7 network, LBS systems of GSM/UMTS mobile cellular communication operators, GPS, and positioning systems over Wi-Fi networks, a USSD unit connected to the interface unit and to the SS7 network, and capable of opening and maintaining a USSD session with the user's mobile device registered on a home or visiting GSM/UMTS mobile cellular communication network;

an SMS unit connected to the interface unit and the SS7 network and permitting SMS messages to be sent in the transaction mode to the mobile device registered on the home or visiting GSM/UMTS mobile cellular communication network;

wherein the interface unit is capable of determining whether a request received from the transaction system is one that must be delivered to the mobile device or not, wherein, in a transaction mode, when the request contains a demand for information that cannot be delivered without involving the user or a demand for information to be transmitted to the mobile device, then the received request is sent through the SS7 network using a USSD session with the mobile device or an SMS message to the mobile device, and wherein when the request contains a demand for information about the mobile device, then further information is collected by the interface unit without involving the user from the information unit, thereby reducing traffic in the SS7 network.

8. A structure as claimed in claim 7, wherein the information unit comprises a module communicating with components of the GSM/UMTS mobile cellular communication networks through components of the SS7 network to collect information.

9. A structure as claimed in claim 7, wherein the information unit comprises a module communicating with components of the GPS to collect information.

10. A structure as claimed in claim 7, wherein the information unit comprises a module communicating with components of the LBS systems of GSM/UMTS mobile cellular communication operators using protocols developed for these systems to collect information.

11. A structure as claimed in claim 7, wherein the information unit comprises a module communicating with components of the positioning systems over Wi-Fi networks using protocols developed for these systems to collect information.

* * * * *